E. W. CLARK.
PHOTOGRAPHY.
APPLICATION FILED FEB. 17, 1921.
1,372,936.
Patented Mar. 29, 1921.
14 SHEETS—SHEET 1.
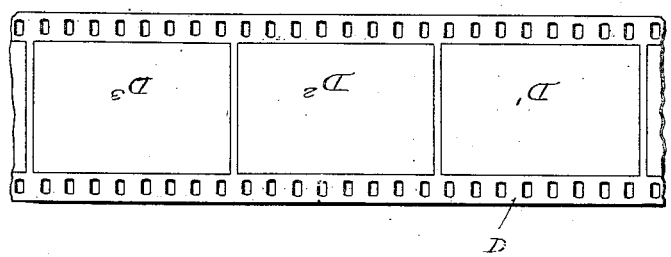
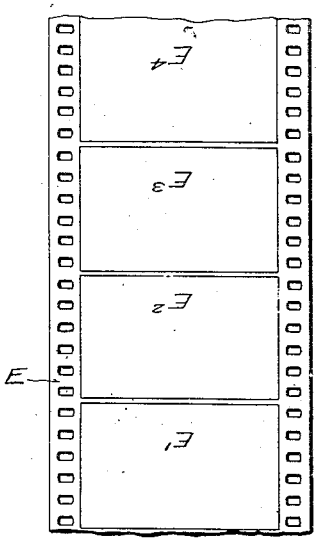
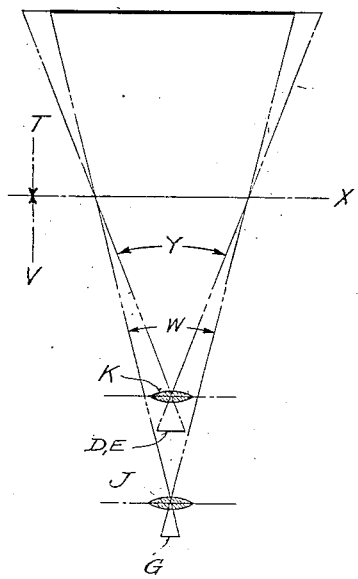
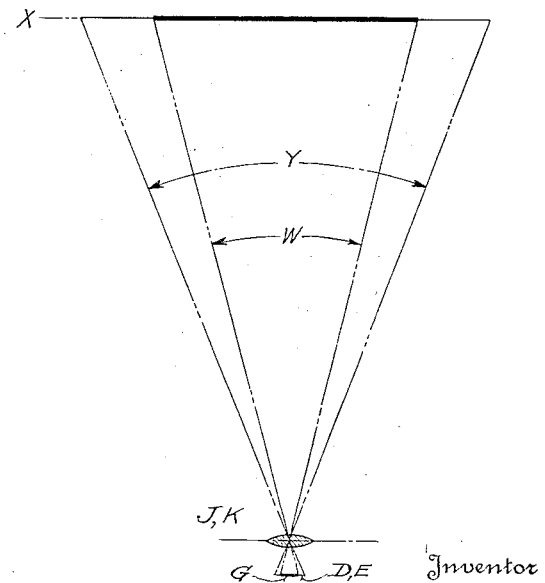
Inventor
Edwin W. Clark
By Delos G. Haynes
Attorney

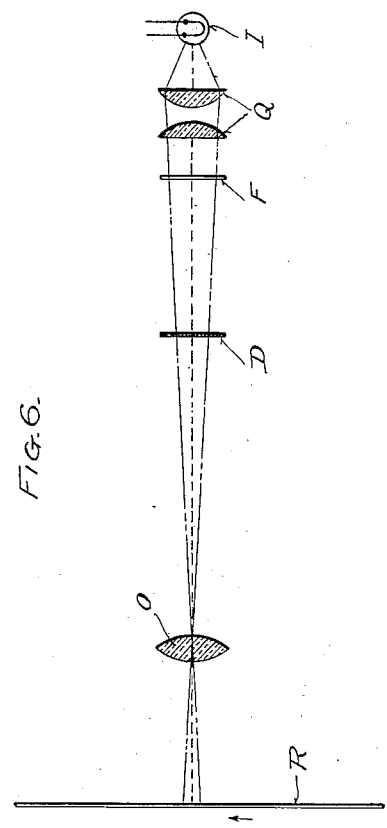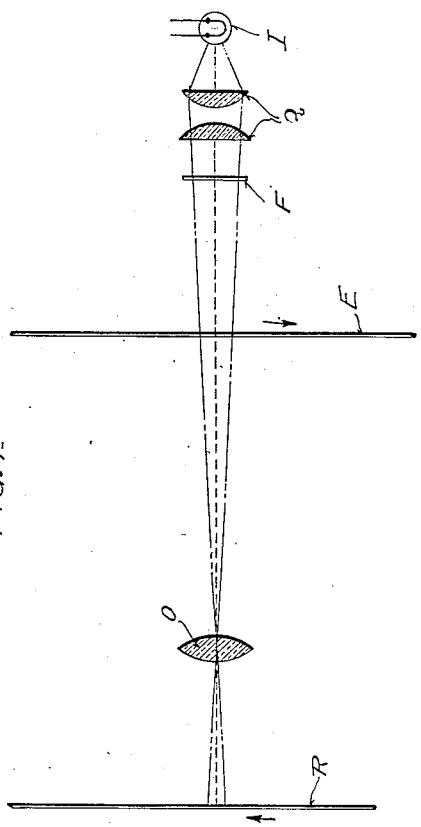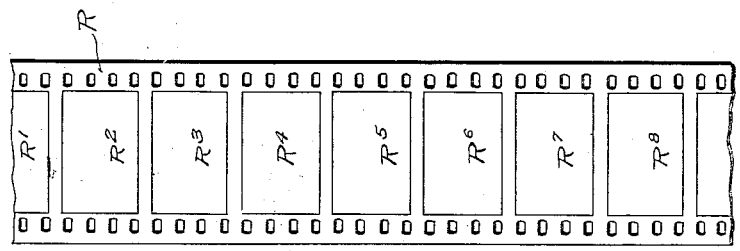

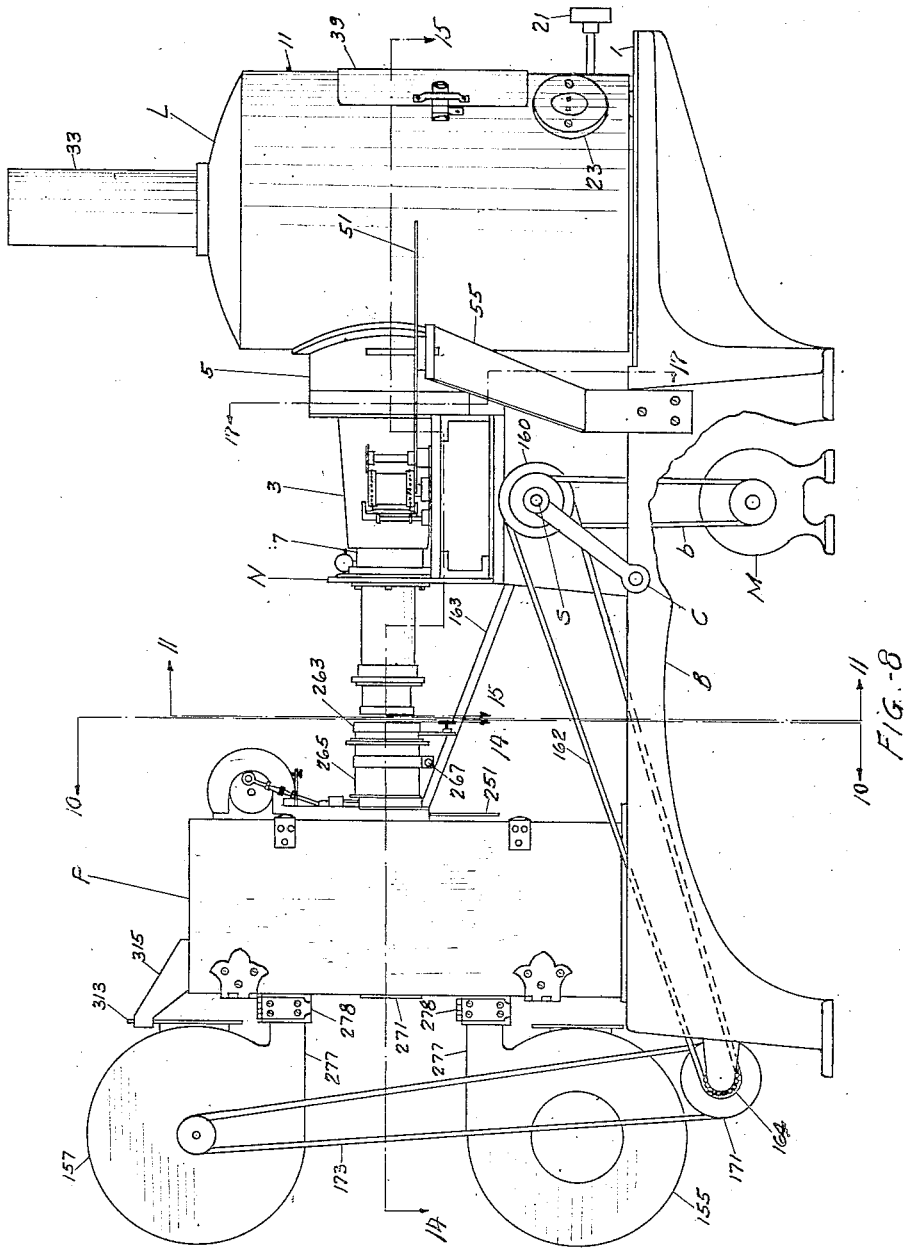

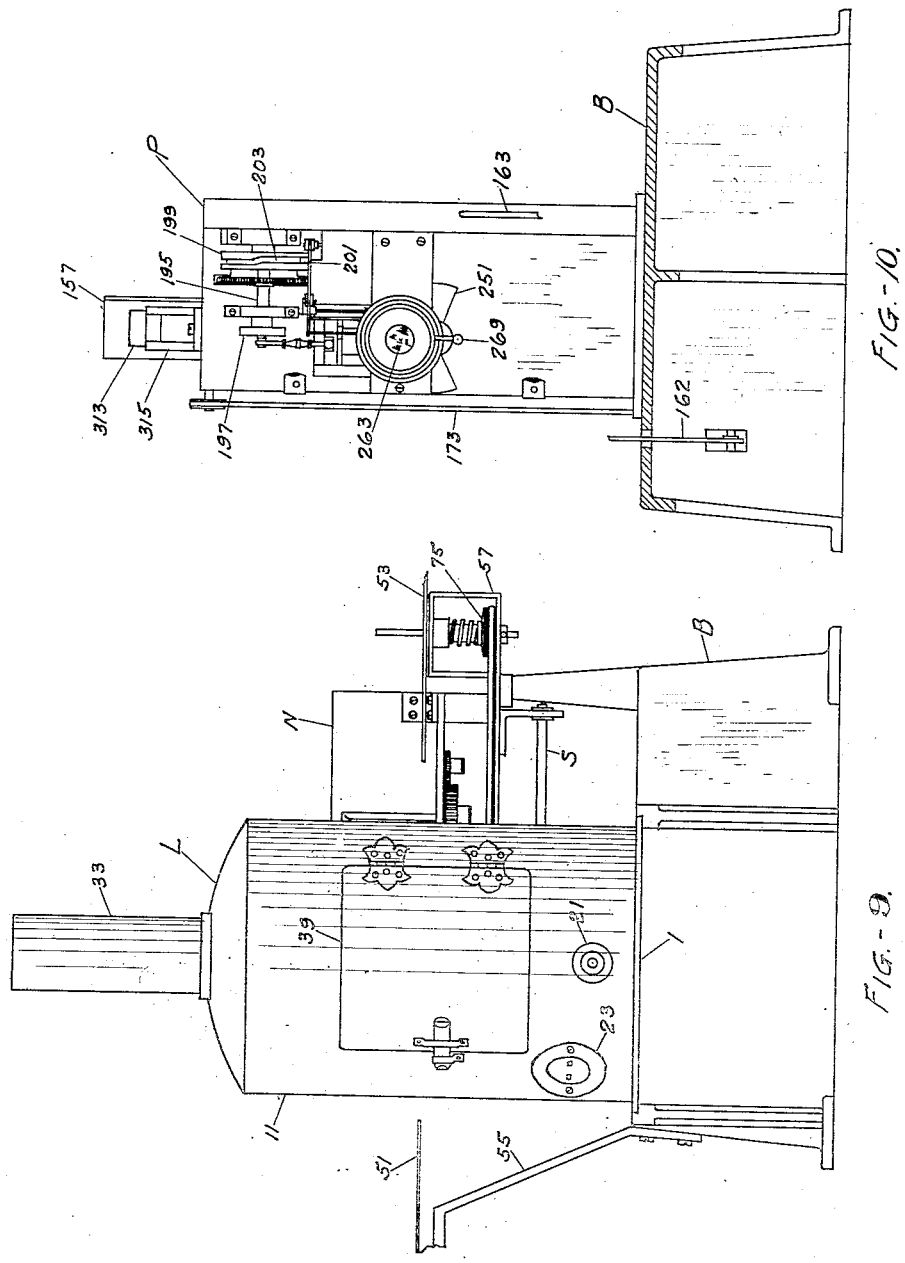

E. W. CLARK.
PHOTOGRAPHY.
APPLICATION FILED FEB. 17, 1921.
1,372,936.
Patented Mar. 29, 1921.
14 SHEETS—SHEET 5.
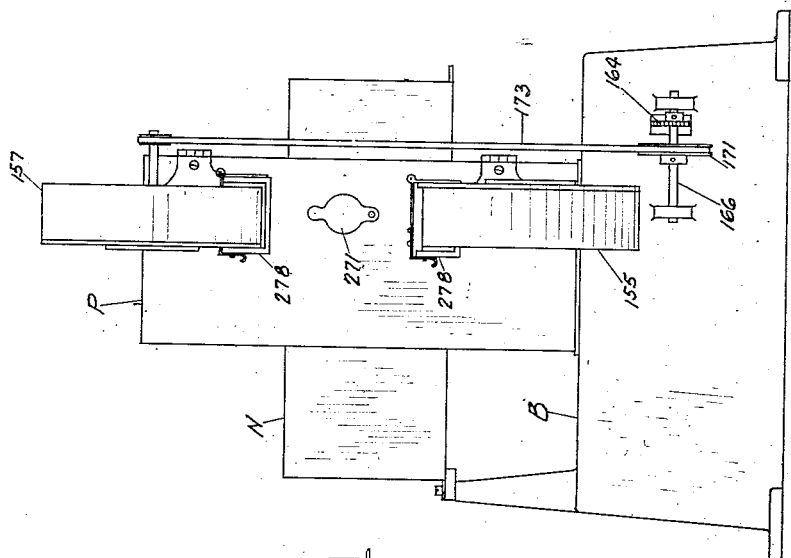
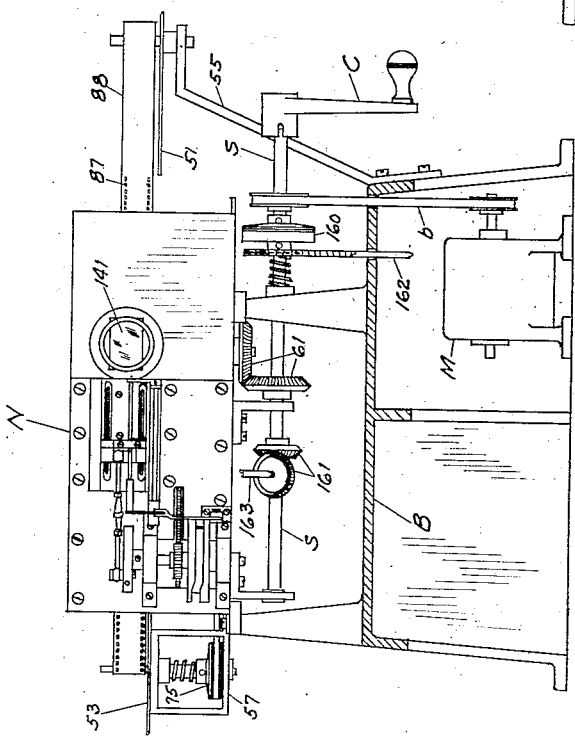

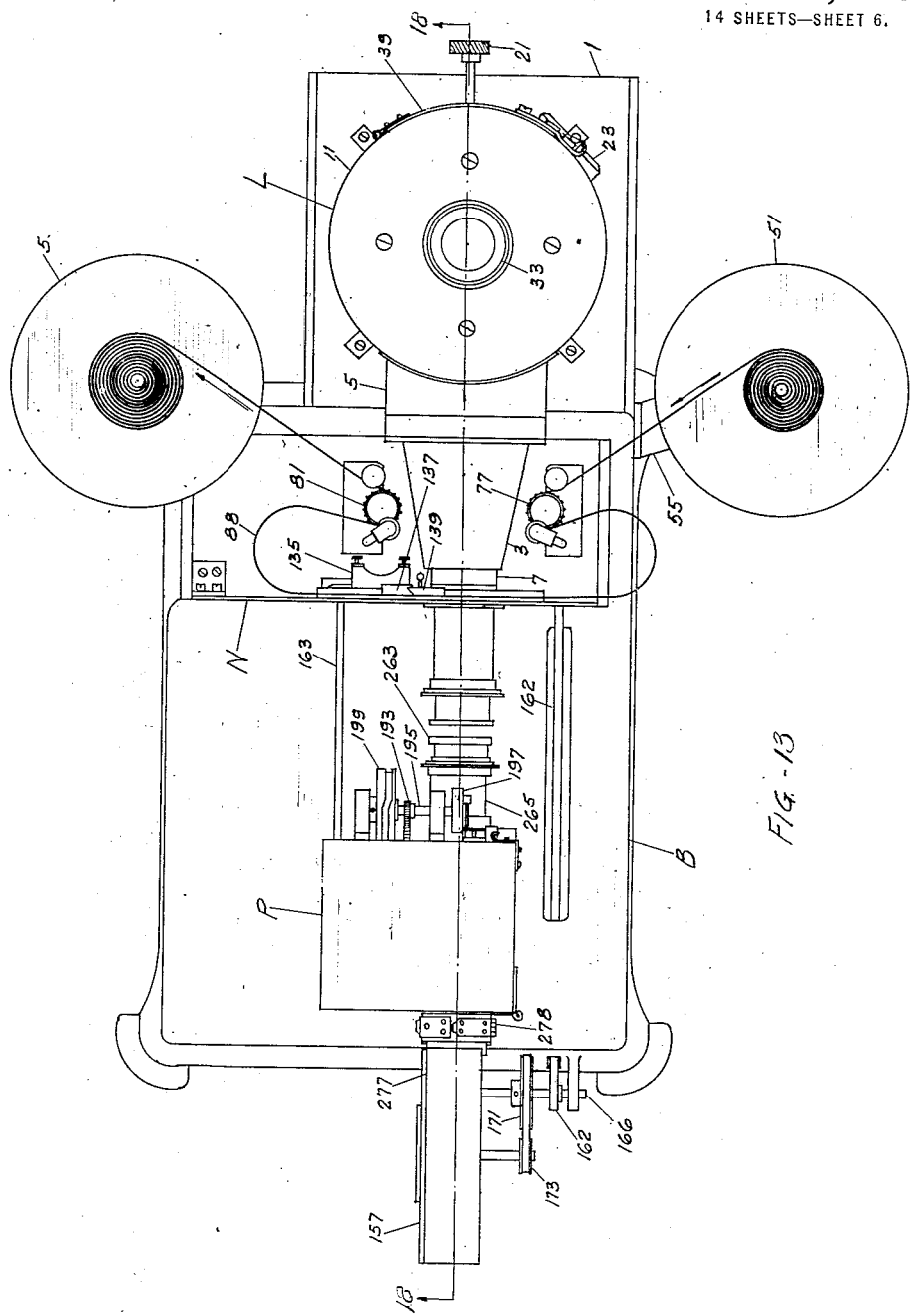

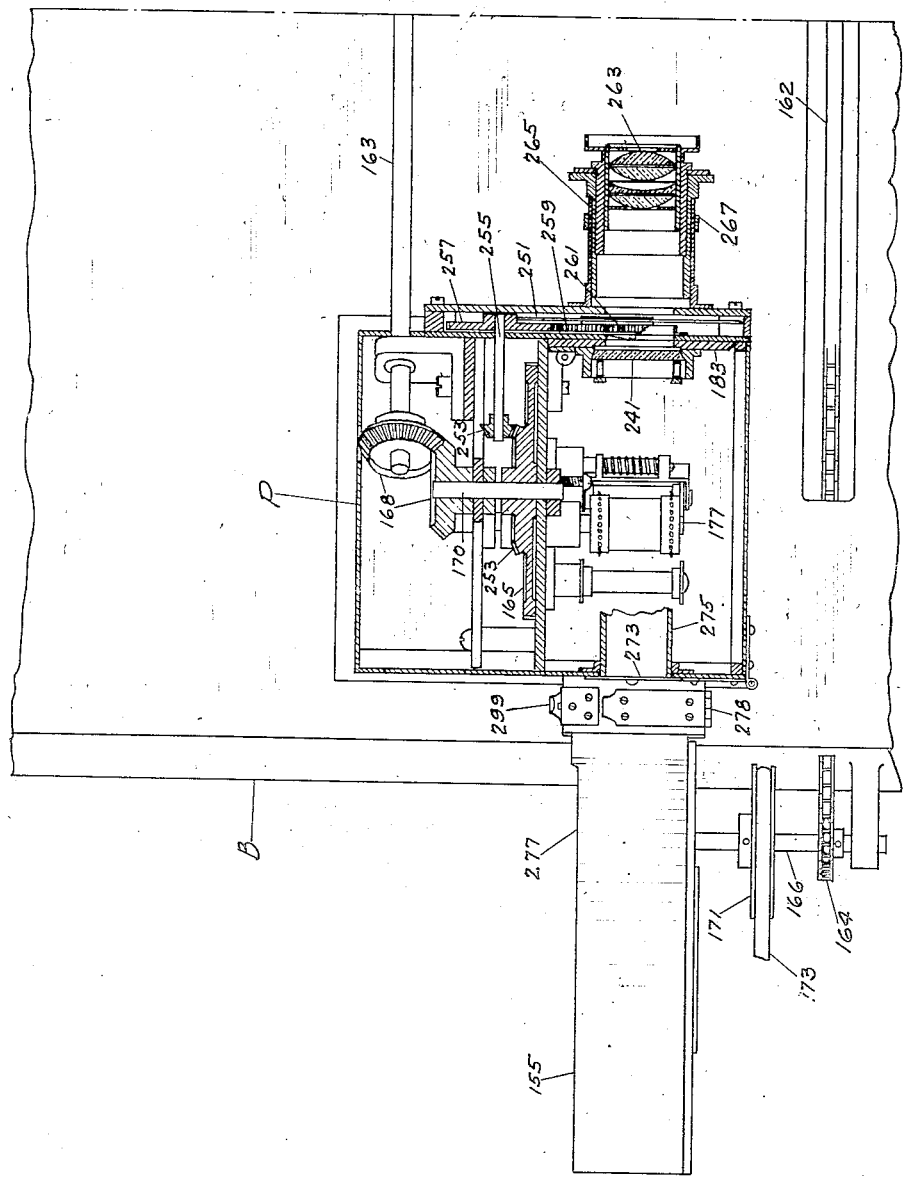

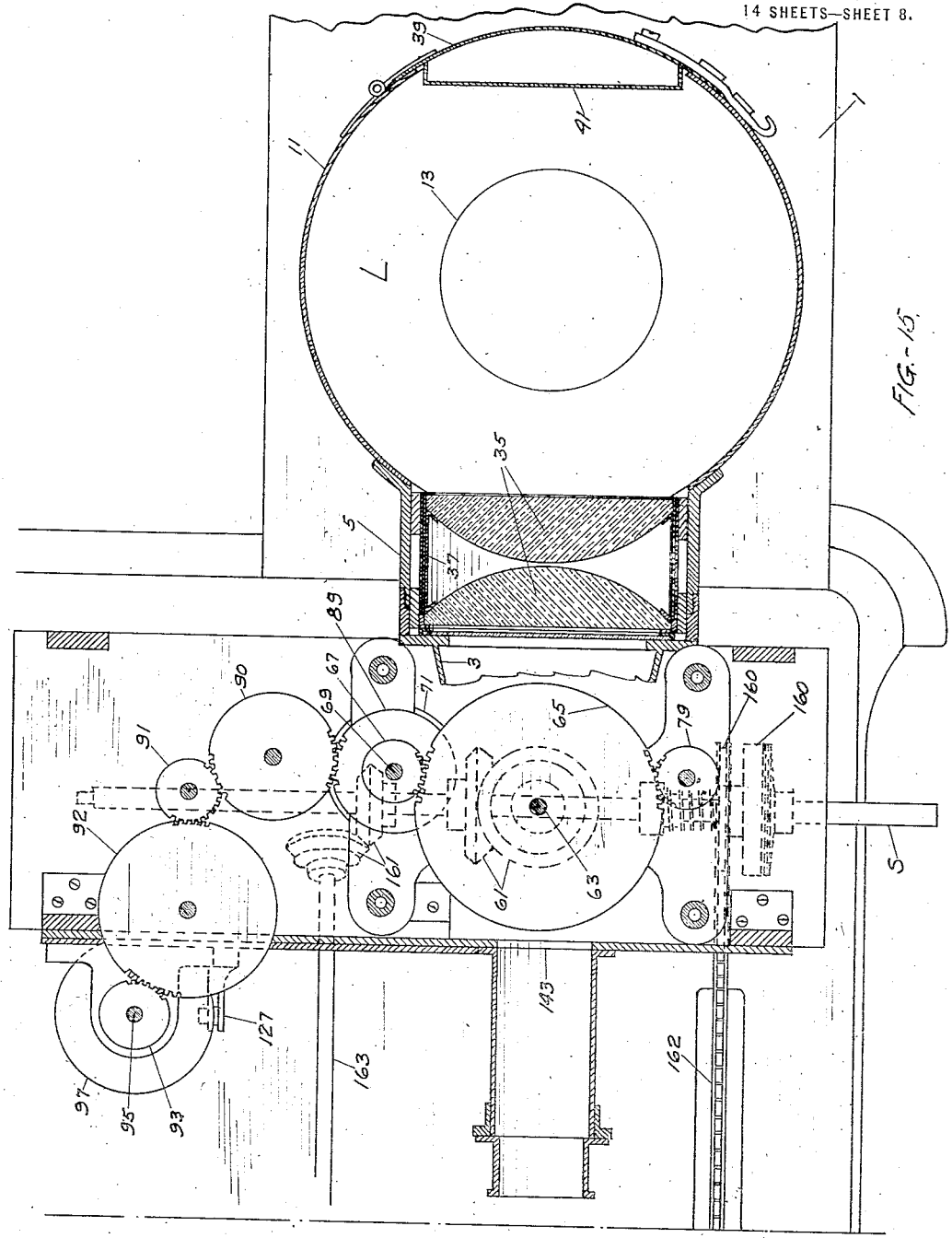

E. W. CLARK.
PHOTOGRAPHY.
APPLICATION FILED FEB. 17, 1921.

1,372,936.

Patented Mar. 29, 1921.
14 SHEETS—SHEET 11.

INVENTOR.
Edwin W. Clark.
BY Delos G. Haynes
ATTORNEY

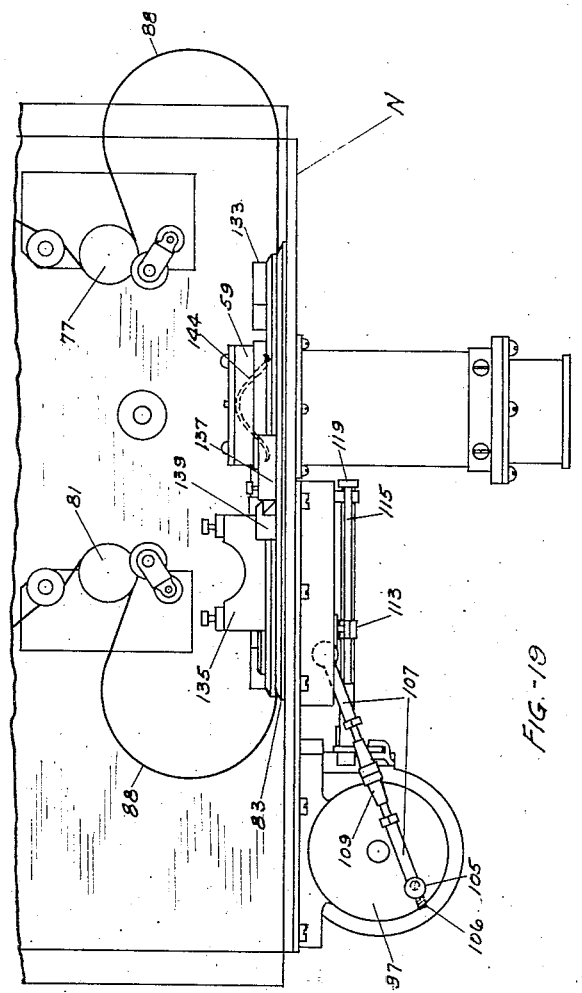

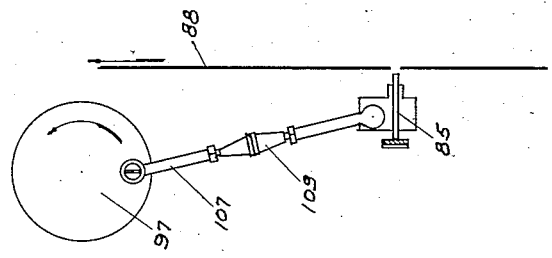
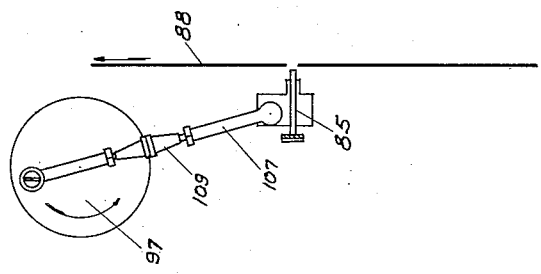
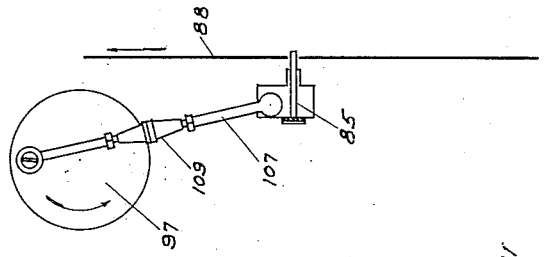
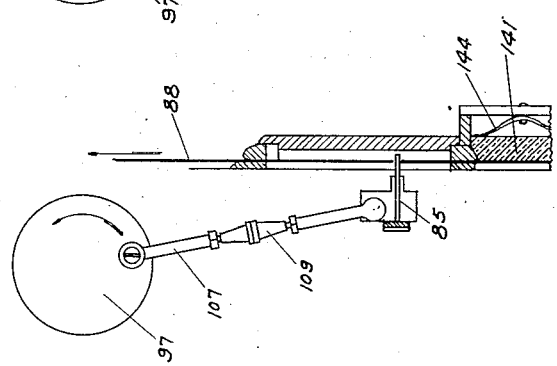
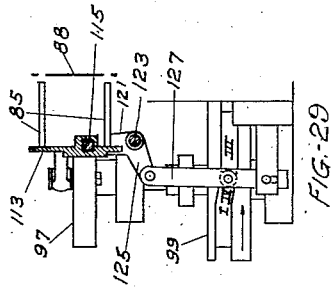

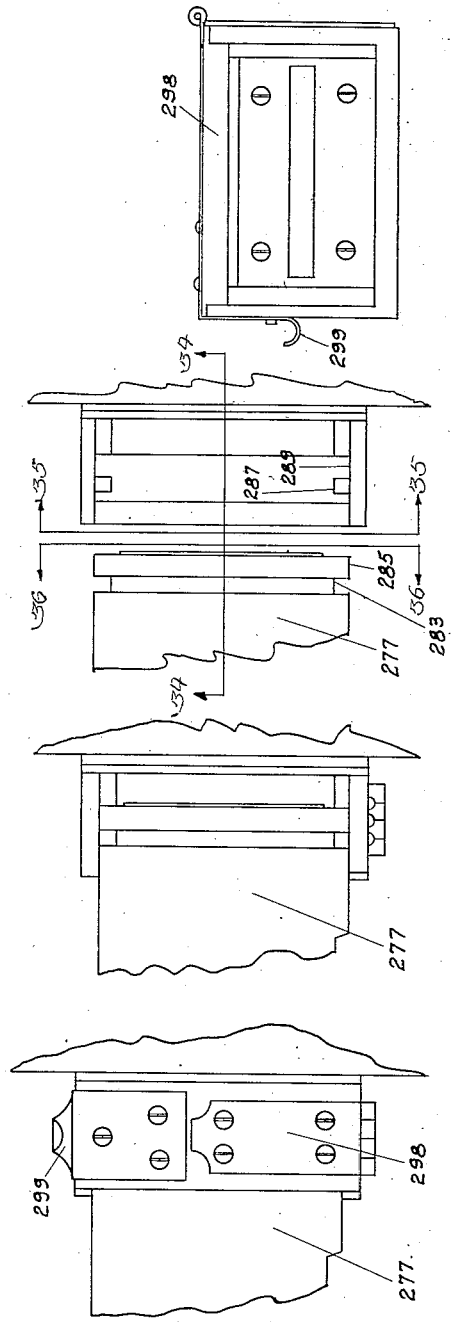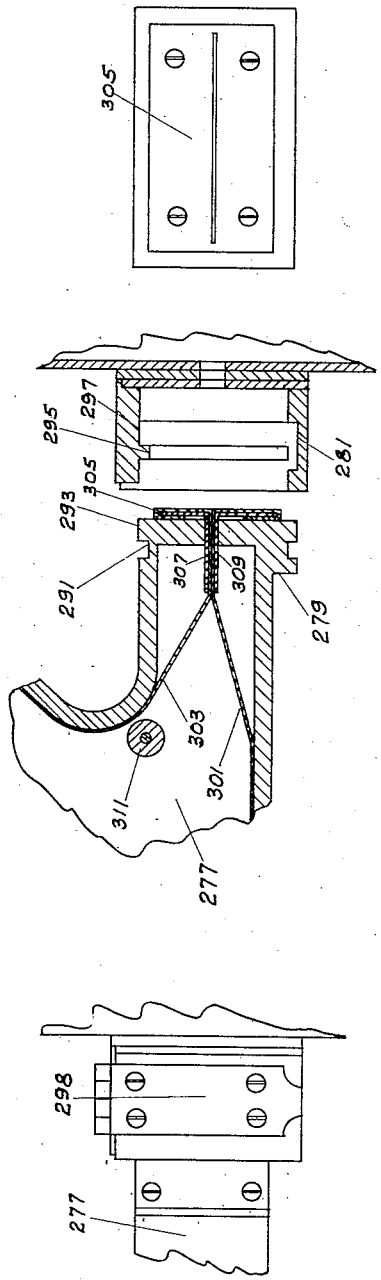

UNITED STATES PATENT OFFICE.

EDWIN W. CLARK, OF CHICAGO, ILLINOIS.

PHOTOGRAPHY.

1,372,936.  Specification of Letters Patent.  Patented Mar. 29, 1921.

Application filed February 17, 1921. Serial No. 445,579.

*To all whom it may concern:*

Be it known that I, EDWIN W. CLARK, a citizen of the United States, and a resident of Chicago, in the county of Cook and State of Illinois, have invented an Improvement in Photography, of which the following is a specification.

This invention relates to photography, particularly to motion pictures.

This application is a continuation in part of my application for patent on photography, filed February 25, 1919, Serial No. 279,085, renewed August 5, 1920, Serial No. 401,561.

Among the several objects of the invention may be noted the provision of a new and effective method of producing motion picture films adapted for projection in standard projection apparatus; and the provision of a printing apparatus and method combining simplicity with a high degree of accuracy and insuring the production of films having definition, registration, and uniformity commensurate with the exacting demands of motion picture projection. Other objects will be in part obvious and in part pointed out hereinafter.

The invention accordingly consists in the features of construction, combinations of elements, steps and sequence of steps, and arrangements of parts, which will be exemplified in the structures hereinafter described and the scope of the application of which will be indicated in the following claims.

In the accompanying drawings, in which are shown one or more of various possible embodiments of the invention, Figure 1 is a face view of a negative film;

Fig. 2 is a similar view of a modification;

Fig. 3 is a diagrammatic plan of two cameras and the fields of view thereof;

Fig. 4 is a similar view showing the cameras in another relation one to the other.

Fig. 5 is a face view of a positive film.

Fig. 6 is a diagrammatic sectional elevation of a form of printing apparatus.

Fig. 7 is a similar view of a modification.

Fig. 8 is a right side elevation of apparatus such as is indicated diagrammatically in Fig. 6.

Fig. 9 is a front elevation of Fig. 8.

Fig. 10 is a transverse section on the line 10—10 of Fig. 8, showing in front elevation the first unit, adapted to contain the sensitized film, which produces a positive film when a negative film is used in the second unit; it being understood that the sensitized film produces a negative film when a positive film is used in the second unit. The first and second units are referred to herein, for brevity, as the positive and negative units, respectively, and the films therein or therefor as the positive and negative films, respectively, the terms positive and negative being used in this connection in an interchangeable sense.

Fig. 11 is a transverse section on the line 11—11 of Fig. 8, showing the negative unit in rear elevation.

Fig. 12 is a rear elevation of the apparatus of Fig. 8.

Fig. 13 is a plan.

Fig. 14 is a horizontal section of the positive unit taken on the line 14—14 of Fig. 8.

Fig. 15 is a horizontal section of the negative unit taken on the line 15—15 of Fig. 8.

Figure 16:
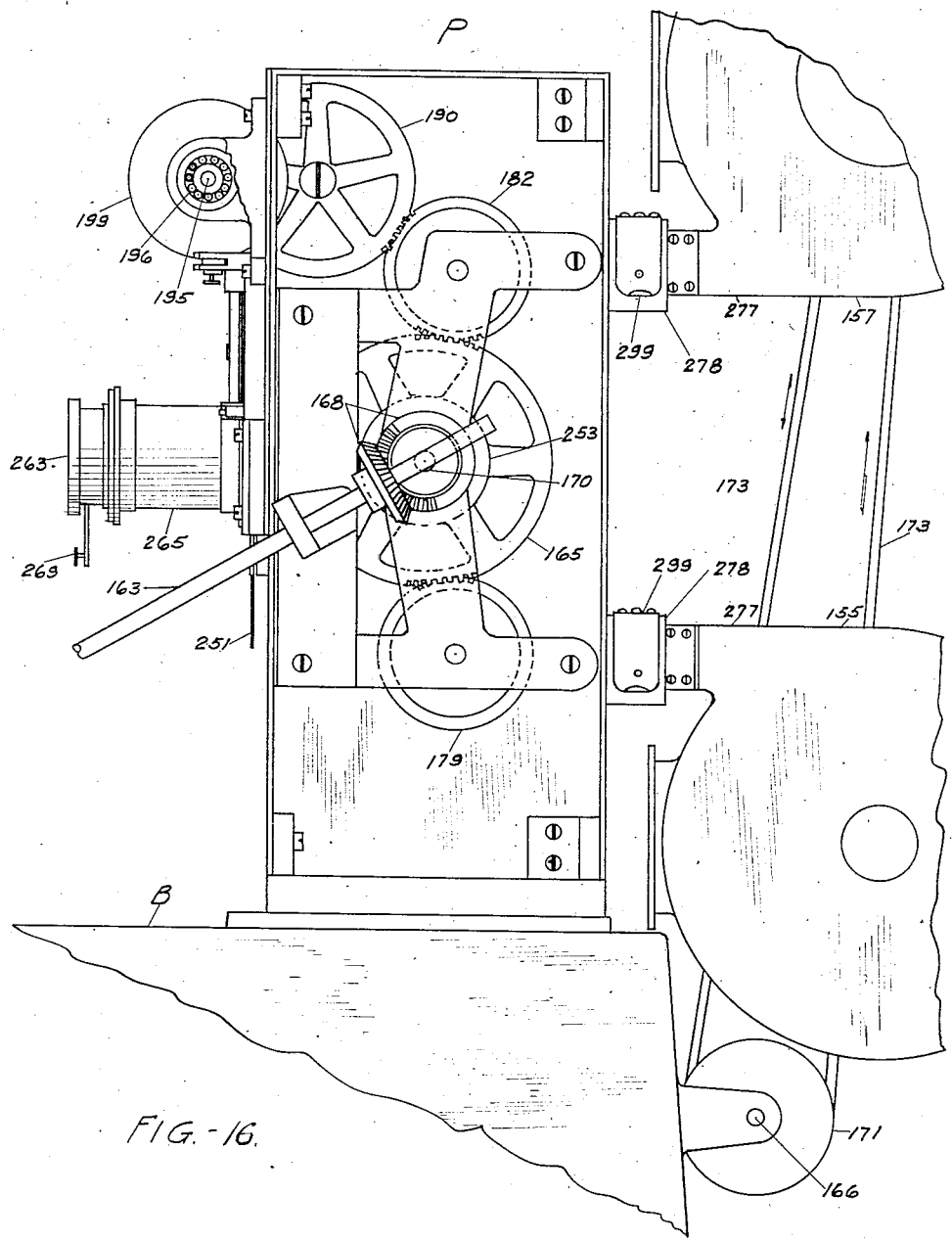

Fig. 16 is a left-side elevation of the positive unit.

Figure 17:
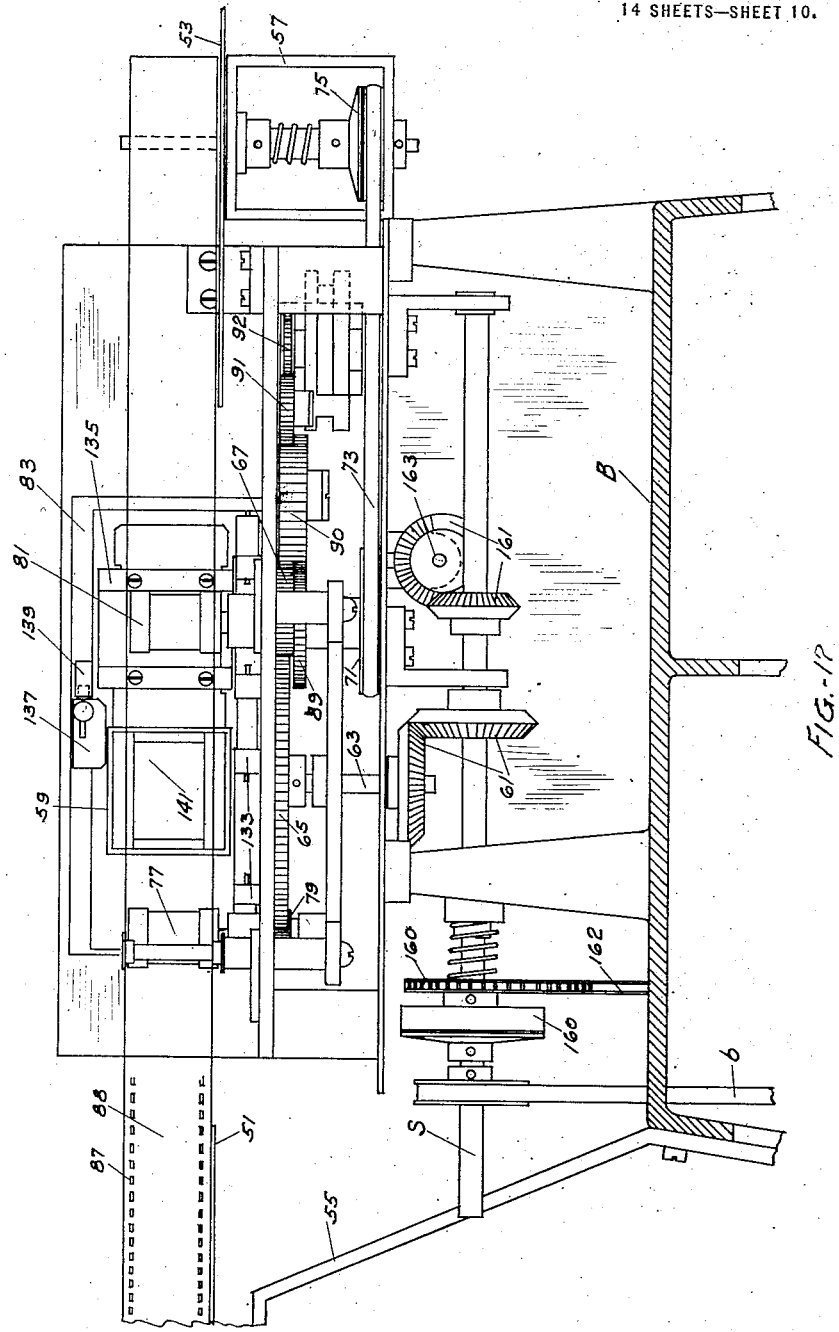

Fig. 17 is a transverse section on the line 17—17 of Fig. 8, showing the negative unit in front elevation.

Figure 18:
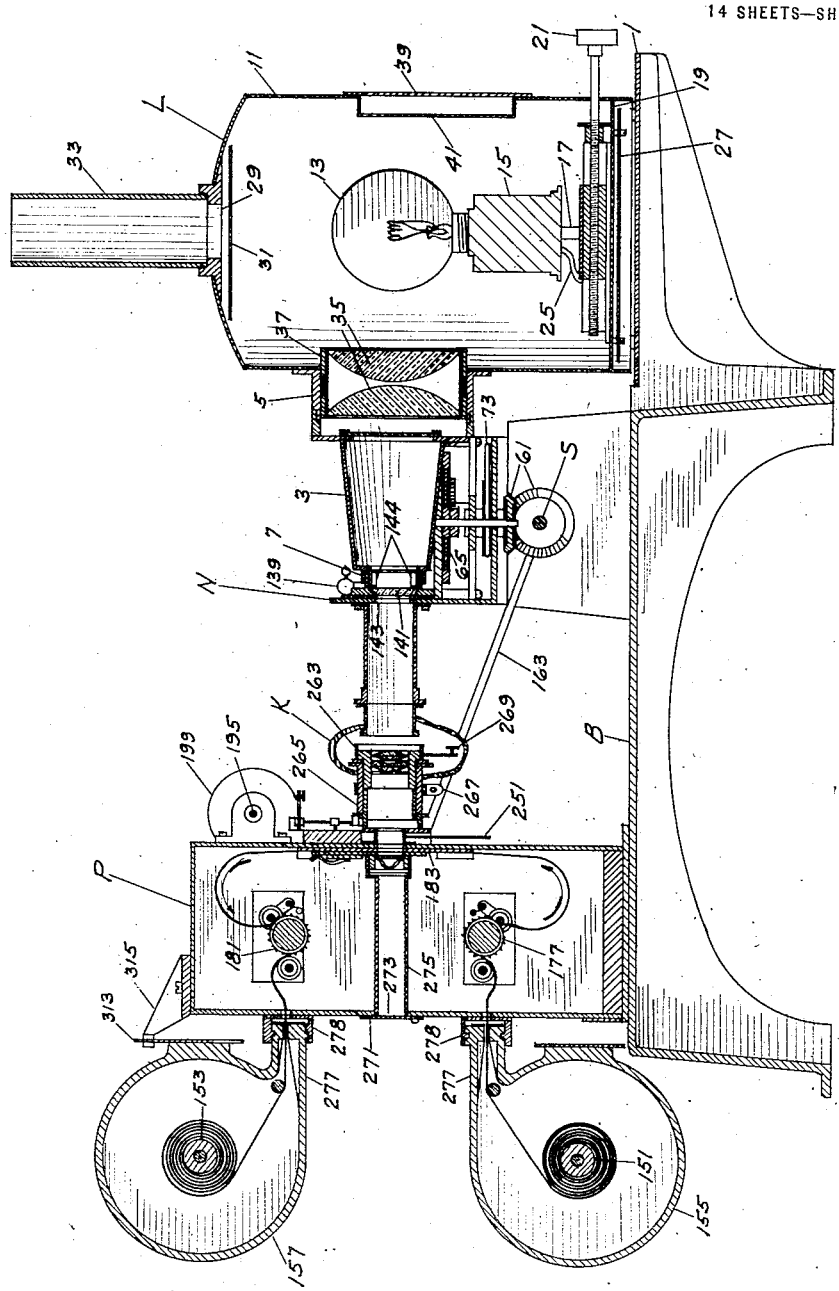

Fig. 18 is a longitudinal vertical section on the line 18—18 of Fig. 13.

Fig. 19 is a plan of the negative film feed and associated parts, on an enlarged scale.

Fig. 20 is a rear elevation of Fig. 19; this shows, on an enlarged scale, the mechanism indicated in the upper left-hand portion of Fig. 11.

Fig. 21 is a vertical longitudinal section on the line 21—21 of Fig. 20, showing the film-feeding pins or fingers of the negative film-feed, and associated parts.

Fig. 22 is a diagrammatic plan of the negative film-feed showing the parts in the position that they occupy at the beginning of the cycle of operation; for convenience, the cycle of operation will be considered as beginning with the first or film-feeding event, which is followed successively by the second or disengaging event, the third or return event, and the fourth or engaging event, these four events constituting the cycle of operation.

Fig. 23 is a right-side elevation of Fig. 22.

Fig. 24 is a plan of the same parts at the beginning of the second or disengaging event.

Fig. 25 is a right-side elevation of Fig. 24.

Fig. 26 is a similar plan at the beginning of the third or return event.

Fig. 27 is a right-side elevation of Fig. 26.

Fig. 28 is a similar plan at the beginning of the fourth or engaging event.

Fig. 29 is a right-side elevation of Fig. 28.

Fig. 30 is a plan of a preferred form of light-tight mounting for the film magazine upon the positive unit, showing the parts in position for operation.

Fig. 31 is a right side elevation of Fig. 30.

Fig. 32 is a plan similar to Fig. 30, showing the cover open.

Fig. 33 is a similar plan with the cover open and the magazine disengaged from the positive unit.

Fig. 34 is a longitudinal vertical section on the line 34—34 of Fig. 33.

Fig. 35 is a section on the line 35—35 of Fig. 33, showing the positive unit in rear elevation, with the magazine removed therefrom.

Fig. 36 is a section on the line 36—36 of Fig. 33, showing the magazine in front elevation.

Similar reference characters indicate corresponding parts throughout the several views of the drawings.

Referring now to Figs. 1 to 7, and more particularly to Fig. 1, there is illustrated at D a negative film of standard size, and adapted to be so mounted in the camera K (Figs. 3 and 4) that the picture area is materially larger than the area of standard pictures. In the present instance, the area is substantially twice the area of the standard pictures. For this purpose I prefer to employ a camera using standard film D, but making the pictures $D^1$, $D^2$ etc., in such manner that their width is lengthwise of the film and their height transverse of the film, as indicated in Fig. 1, the width being substantially twice the height of standard pictures and the height being substantially equal to the width of standard pictures, so that the picture area on the negative film as shown in Fig. 1 is substantially twice the area of standard pictures. The spacing of pictures along the negative film is twice the standard spacing. The standard spacing is three quarters of an inch, or four sprocket holes per picture; so that the spacing in the film D is one and one-half inches or eight sprocket holes per picture. The camera K, having a film feed of one and one-half inches or eight sprocket holes and adapted to make pictures arranged as indicated in Fig. 1, uses preferably standard lenses and is preferably geared to operate at the standard number of pictures per revolution of the hand crank (not shown), notwithstanding the fact that the camera utilizes twice the standard length of film for each picture.

In Fig. 2 is shown another form of negative film E, preferably similar to the film D as to size of pictures, but differing therefrom in the arrangement of the pictures. Film E is wider than standard, and as it is not in common use at the present time, I prefer to employ the negative of Fig. 1. Film E has the pictures arranged with the height lengthwise of the film, such pictures occupying in the illustrated embodiment the same picture area as in film D. The pictures $E^1$, $E^2$, etc., on film E extend along the negative a distance of about one inch.

The provision of a negative picture area of twice the standard area is a preferred ratio, but this invention is not limited to such ratio.

I prefer to make the positive R of Fig. 5, having pictures $R^1$, $R^2$, etc., thereon, from the negative D of Fig. 1, either directly by the method and apparatus indicated in Fig. 3, or with additional steps of printing. For example, the positive R may be produced from a negative D by said method or apparatus, or it may be produced by contact printing from a negative which was produced by said method or apparatus from a positive which in turn was made by contact printing from the negative taken in the camera.

The preferred method and apparatus are illustrated diagrammatically in Fig. 6, in which a source of illumination I is shown as sending rays through condensers Q, diffuser F, negative film D and objective lens O, where the rays are focused upon the positive film R, the parts being so positioned that the negative film moves at right angles to the direction of movement of the positive film. In Fig. 6 the negative film moves in a horizontal direction at right angles to the plane of the paper at a feed of eight sprocket holes (twice the standard feed), while the positive film R moves in a vertical direction parallel to the plane of the paper at the standard feed of four sprocket holes; and the objective is so located as to form the positive picture on an area substantially equal to (in this instance eight-ninths of) the area of standard pictures, and substantially one half (in this instance four-ninths) the area of the pictures on the negative film D.

The positive film is thus preferably made from a negative containing pictures of about twice the area of the positive pictures. This size of negative picture is preferred because it can be obtained with standard lenses in the camera K and utilizes about the maximum working angle at which these lenses can be advantageously used.

The film R differs from prior art film photographed with a camera having a lens of the same focal length. For example, if the pictures on the film D are taken with the camera K located as shown in Fig. 3, and if standard pictures G are taken from such a viewpoint that the width of field at the plane of principal action X in both negatives is the same, the camera K used for the former is closer (in this instance one-third closer) to the plane of principal action X than is the camera J used for the latter; and this closer proximity of the camera to the plane of action produces, in scenes having any depth whatever, a greater width of vision in the background T and a greater foreshortening or perspective, as well as less foreground V, and gives to the spectator a sense of being nearer to the plane of principal action. In fact, by thus shortening the foreground, it is often possible to make pictures that could not otherwise be taken because of intervening objects. The angles of view W, Y correspond to the cameras J, K respectively.

Referring now to Fig. 4, as illustrating another difference between the pictures obtained with the present invention and standard pictures, the cameras J and K are shown as located at the same view point. In this instance, the pictures taken with the camera K embrace a greater angle of view Y than those taken with the standard camera J. In the embodiment herein illustrated the negative pictures $D^1$, $D^2$, etc., are half again the width of standard negative pictures G, and the horizontal angle Y embraced by the former is half again greater than the horizontal angle W embraced by the latter. Similarly the one-third greater height of the pictures $D^1$, $D^2$, etc., as compared with standard negative pictures G, means that the former embrace a vertical angle one-third greater than is embraced by standard negative pictures.

The term "plane of principal action" is used herein as indicating the plane, perpendicular to the optical axis, in which the principal action takes place, or would take place. The term "foreground" indicates the space between the camera and such plane. By "background" is meant the space behind such plane.

The positive film is thus preferably made from a negative containing pictures of about twice the area of the positive pictures; though if desired, the positive pictures may be made even smaller or may be made slightly larger than standard, though they preferably adhere to standard picture spacing. From this it follows that the characters on the positive pictures will be smaller than they are on the negative.

In projecting the (positive) film R onto a screen in order that the characters may be of usual or standard height on the screen, the magnification should be such that the projected picture has about twice the usual area, which means that the screen should have about twice the usual area. If this is done, the characters will appear on the screen in standard proportions, and by virtue of the reduction and enlargement herein set forth, such standard size of characters is attainable over a screen area of substantially twice standard size, by the use of standard projection apparatus.

The modified type of negative shown in Fig. 2 is preferably printed by the method and apparatus indicated in Fig. 7, either directly or with additional steps of printing as above described in connection with Fig. 6. In Fig. 7 the source of illumination I sends rays through condensers Q, diffuser F, negative film E and objective lens O, where the rays are focused upon the positive film R, the parts being so positioned that the negative film moves parallel to the direction of movement of the positive film and in the opposite direction. The method and apparatus thus resembles that shown in Fig. 6, except that the relative movement of positive and negative films is at right angles in Fig. 6 and parallel in Fig. 7. The relation of areas of negative and positive films in Fig. 7 is preferably of the same order of magnitude as in Fig. 6, and similar results are obtained.

Referring now more particularly to Fig. 8, there is illustrated an apparatus which, for convenience, may be considered as comprising three units, namely, the illuminating unit L at the front (the right-hand end of Fig. 8); the negative unit N carrying the negative film D, from which the printing is to be done; and the positive unit P at the rear (the left-hand end of Fig. 8), carrying the positive film R, upon which the printing is to be done.

This apparatus is suitable for printing from the negative D of Fig. 1 to the positive R of Fig. 5, and exemplifies the method and apparatus shown diagrammatically in Fig. 6. With certain changes, indicated above, the apparatus is suitable for carrying out the printing shown in Fig. 7, for producing the positive R from the negative E of Fig. 2. The terms negative and positive are only relative, as a positive film can, of course, be run in the unit N and a negative be made in the unit P therefrom.

These three units are preferably mounted on a single base B, and are normally maintained in fixed relation thereon, suitable provision being made, if desired, for adjusting the units with respect to each other on the base. The adjustment of the illuminating unit L with respect to the negative unit N (Figs. 8, 9, 13, 15 and 18) is conveniently effected by slidably mounting the former at 1 upon the base B, and providing said illuminating unit with a hood 3 extending from the condenser case 5 and terminating at its rear end in a frame 7 which fits around the aperture box 59 (as shown in Figs. 17 and 18) of the negative unit N. The adjustment of the lenses and negative and positive units with respect to one another is not illustrated in detail, in order to simplify the drawings; such adjustment may be of any suitable type, or, in fact, in many instances this adjustment can be omitted.

Considering first the illuminating unit L, (Figs. 8, 9, 13, 15 and 18) there is provided a lamp-house 11 carrying the condenser case 5 above mentioned and inclosing a source of illumination, such as the electric lamp 13, mounted in a socket 15, vertically adjustable upon the guides 17, and longitudinally adjustable along the floor 19 of the house by means of a hand-wheel 21. Power is transmitted to the lamp-socket from external wires terminating in a plug (not shown), adapted to be inserted in the receptacle 23 from which the wires 25 run to the lamp-socket. Ventilation is provided, without loss of light or undue radiation of heat in proximity to the reels of film, by apertures 27 in the base of the lamp-house for incoming air, and an aperture 29 in the top, below which is a baffle-plate 31 so located as to prevent light rays from passing out through the aperture. If desired, a heat-stack 33 may be provided to carry the heated air up well out of the way of the negative film and other parts of the apparatus.

The condensers 35 are mounted in a sleeve 37 which, in turn, is slidably mounted in the condenser case 5, above mentioned.

The door 39 of the lamp-house is provided with an inwardly extending baffle 41, to prevent escape of light from the house.

Referring next to the negative unit N, there is shown in Fig. 8 the several portions of this part of the apparatus in right side elevation; in Fig. 11, a rear elevation; in Fig. 13, a plan; in Fig. 15, a horizontal section on line 15—15 of Fig. 8; in Fig. 17, a front elevation; in Fig. 18, a central longitudinal section; and in Figs. 19 to 29, the film-feed details and operation.

This negative unit comprises feed and take-up reels, 51, 53, mounted on brackets 55, 57, at the right and left sides of the apparatus respectively. The take-up reel is driven from the motor M (Figs. 8 and 11) through the belt b, main drive-shaft S, bevel gears 61, negative drive-shaft 63, negative drive-gear 65, gear 67, shaft 69, pulley 71, spring-belt 73 and friction pulley 75. The slipping at the friction pulley 75 insures uniform winding tension, regardless of the varying diameter of the film wound on the take-up reel. A hand-crank C is detachably mounted on the main drive-shaft S, for convenience in operating the device during adjustment and at other times when some speed outside the range of the motor speeds is desired.

The mechanism for effecting an intermittent advance of the film past the aperture-plate 83 is referred to, for convenience, as the negative film-feed, and comprises two pins or fingers 85 that are actuated in cycles of suitable frequency, each cycle of operation including four events. Considering the cycle as beginning with the film-feeding event, this event is referred to as the first event of the cycle. During this time the pins are in engagement with perforations 87 in the standard film 88 (which in the preferred embodiment is the film D of Figs. 1 and 6) and the pins move in such a way as to advance the film through the desired picture spacing, this spacing being ordinarily equal to some integral number of holes multiplied by the center-to-center distance between adjacent holes. In the present instance, the negative feed is eight holes, or double the usual or standard four-hole stroke. With an adjustment of the film-feeding mechanism, the feed can be changed to any other desired number of holes. During the second or disengaging event of the cycle, the pins are withdrawn rearwardly of the machine, away from the film, and during this time the pins do not move any substantial distance either to the right or to the left of the machine. During the third or return event, the pins return toward the right side of the machine, out of engagement with the film. During the fourth or engaging event, the pins move forwardly of the machine, without material movement to the left or right, into engagement with a new pair of perforations in the film. This completes the cycle of operations, and the apparatus is now ready for the first or film-feeding event of the next cycle. The mechanism for effecting this cycle will now be described.

Power from the motor M is communicated to the shaft 69, as above described. On this shaft is mounted a gear 89 driving three idlers 90, 91, 92, the latter meshing with a pinion 93 on a vertical cam-shaft 95 mounted on ball bearings (not shown). This vertical cam-shaft 95, driven thus at uniform speed by the motor M, carries a crank-disk 97 and a cylindrical cam 99, with a roller follower 101 running in a groove 103. On the crank-disk 97, at a suitable distance from the axis of the cam-shaft 95, is an eccentrically mounted crank-pin 105 secured in position by a set-screw 106 and carrying a connecting-rod 107 having a right-and-left thread 109 for adjusting its length to frame the picture by varying the location of the path of movement of the pins 85 with respect to the aperture-plate 83. At the other end of this connecting-rod 107 is a main carriage 111 traveling parallel with the film in rigid guides milled in a cast block or bed-plate 112 having adjustable gibs 114. This carriage moves in a vertical plane, moving horizontally transversely of the machine, and standing at the right end of the apparatus at the beginning of the cycle.

On this main carriage 111 is mounted a cross-carriage 113 carrying the pins or fingers 85 that enter the perforations along the sides of the film, as above indicated (Figs. 22–29), and advance the film thereby during the first or feeding event of the cycle. This cross-carriage moves horizontally from the front of the machine to the rear to disengage the film, and from the rear of the machine forwardly to engage the film. At the beginning of the cycle, this cross-carriage is in its forward position. The cross-carriage 113 is moved to the left and right of the machine together with the main carriage, because it carries pins running through main carriage 111 lengthwise of the machine, and is thus prevented from any movement to the left or right of the machine relatively to the main carriage. These pins, however, permit movement of the cross-carriage forwardly and rearwardly of the machine, and this motion is effected by an oscillating rod 115 extending parallel to the film 88 and passing through a slot 117 in the cross-carriage, at a point about midway between the pins, insuring negligible twisting of the pins and cross-carriage as they move toward and away from the film, and making it practicable to use a slight cam-roller displacement—an advantage referred to hereinafter. The rod 115 is mounted at either end on rockers 119, 121, carried by a single rock-shaft 123. The rocker 121, adjacent the cylindrical cam 99, has a second arm 125, making it a bell-crank lever, and to this second arm is connected a downwardly extending link 127 slidably mounted at its lower end in a roller guide 129, and carrying at an intermediate point the roller 101 that acts as the follower in the cam 99.

The cylindrical cam 99 has a steel-faced milled groove 103 divided into four parts. The first or upper part I (at the right of Fig. 21; at the left of Fig. 23; at the right in Fig. 25; at the left in Fig. 29) is effective during the first or feeding event. The second or downwardly slanting part II acts during the second or disengaging event through the bell-crank mechanism above mentioned, to force the cross carriage and its pins rearwardly out of engagement with the film. The third or lower part III (at the right in Fig. 20; at the left in Fig. 21; at the left in Figs. 25 and 27; and at the right in Figs. 23 and 29) is active during the third or returning event, and holds the fingers away from the film. The fourth or rising part IV (Fig. 20) acts during the fourth or engaging event to force the cross-carriage forwardly and thereby move its pins or fingers into engagement with the film. This completes the cycle. The offset between the upper and lower parts I, III, is slight because the rod 115 is at a considerable distance from the rock-shaft 123, so that a small movement of the cam-follower 101 effects the desired travel of the cross-carriage 113.

To recapitulate: During the first or film-feeding event, the cam-roller is up, the main carriage starts at the right end of its travel and moves to the left end of its travel, and the cross-carriage is in its forward position and remains in this forward position, with its pins engaging the film. During the second or disengaging event, the cam-roller moves downwardly, the main carriage is substantially stationary at the left end of its travel, and the cross-carriage moves rearwardly to disengage the film. During the third or returning event, the cam-roller is down, the main carriage starts at the left end of its travel and moves to the right end of its travel, and the cross-carriage is in its rearward position, and remains in this rearward position, with its pins out of engagement with the film. During the fourth or engaging event, the cam-roller moves upwardly, the main carriage is substantially stationary at the right end of its travel, and the cross carriage moves forwardly to engage the film. This completes the cycle.

This, briefly, is the intermittent feed mechanism. As will hereinafter appear, this mechanism is substantially repeated in the positive unit.

The aperture-plate 83 and its associated parts comprise, briefly, the aperture-plate *per se* provided with slots 131 through which pass the film-fingers 85; hinges 133 for the film-gate 135; and a catch 139 coöperating with the latch 137 on the film-gate to hold the latter in vertical or operating position. The film-gate comprises a glass pressure-plate 141 (Figs. 11, 17, 18 and 20) pressed against the aperture 143 in the aperture-plate 83 by means of the separate leaf-springs 144 (Figs. 18, 19 and 22); and the tension-plate varying tension shoes 145 spring-pressed against the surface of the aperture-plate 83 on either side of the slots 131. The glass plate holds the film flat in the operative focal plane and the tension-shoes arrest the motion of the film promptly when the feeding movement ceases.

From the above it will be seen that rays of light from the illuminating unit L, properly refracted by the condenser lenses pass through the negative film at the aperture-plate of the negative unit N. It is the image of this exposed area of the negative film that is to be printed upon the positive film in the positive unit P. For this purpose the positive unit is provided with means for feeding its film past its aperture-plate intermittently, to expose successive substantially standard-size areas or frames of the positive film to the action of light from successive exposed areas of the negative film, the latter areas or frames being substantially as high as the width of standard pictures, and substantially as wide (lengthwise of the film) as eight sprocket holes or twice the height of standard pictures, as indicated in Figs. 14, 17, 18 and 20, for example. The periods of rest of the two films are timed to coincide, or at least to coincide during the portion of such periods that is devoted to exposure, the limits of this exposure portion being determined by a shutter that alternately permits and obstructs the passage of light rays from the negative film area to the positive film area.

Considering now the mechanism of the positive unit, reference is had to the right-side elevation in Fig. 8; the front elevation in Fig. 10; the rear elevation in Fig. 12; the plan in Fig. 13; the horizontal section in Fig. 14; the left-side elevation in Fig. 16, and the vertical longitudinal section on the optical axis in Fig. 18. The details of the film-feed have been described above in connection with the negative unit N, and inasmuch as the positive film-feed is substantially the same as the negative film-feed, except that the former is constructed to feed four holes per stroke, corresponding to the standard picture spacing of four holes or about three-fourths of an inch, the positive film-feed is not shown except in its relation to other parts of the mechanism.

The positive unit comprises feed and take-up magazines 155, 157, at the lower and upper part of the rear side of the unit. The spool 151 in the take-up magazine is driven from the motor M (Figs. 8, 11, 14) through the belt $b$, main drive-shaft S, friction sprocket 160, chain 162, sprocket 164, shaft 166, pulley 171 and spring-belt 173. The slipping at the friction sprocket 160 insures uniform winding tension, regardless of the varying diameter of the film on the take-up spool.

Power for operating the feed sprocket 177 (Figs. 14 and 18) is derived from the main drive-shaft S through bevel gears 161 (Figs. 11 and 17) positive drive-shaft 163, bevel gears 168, shaft 170, positive drive gear 165, and feed sprocket pinion 179. The gear 168 on shaft 163 is adjustable to engage its companion gear at either side of the latter, so that the direction of drive of the positive unit with respect to the negative unit can be readily reversed. This reversal is often useful in connection with so-called "trick pictures". This reversal involves merely shifting of the take-up reel drive from the upper magazine to the lower, and this may conveniently be done by removing the belt from the former and applying a shorter belt to the latter to connect it with the pulley 171.

The sprocket 181 (Fig. 18) is driven from the positive drive gear 165 through the gear 182 (Fig. 16).

The mechanism for effecting an intermittent advance of the positive film R past the aperture-plate 183 (Figs. 14 and 18) is referred to, for convenience, as the positive film-feed, and as indicated above is similar to the negative film-feed hereinbefore described. The positive film-feed comprises a pair of pins or fingers that are actuated in four-event cycles, as in the negative film-feed. The feed in the positive unit, however, is preferably four holes, for the reasons hereinabove explained.

Power for operating the positive film-feed from the motor M is communicated to the gear 182, as above described. This gear drives an idler 190, the latter meshing with a pinion 193 on a horizontal cam shaft 195 mounted in ball bearings 196. This horizontal cam-shaft 195 carries a crank disk 197 and a cylindrical cam 199, with a roller follower 201 running in a groove 203. The remaining parts of the positive film-feed are similar to corresponding parts of the negative film-feed.

The aperture-plate 183 and its associated parts comprise, briefly, the aperture-plate *per se* of preferably substantially standard size provided with slots, hinges and a catch similar to the corresponding parts in the negative unit, and the film-gate has a latch, glass plate 241, and spring-pressed tension-plate or shoes also similar to the corresponding parts in the negative unit.

The shutter 251, (Figs. 10, 14, 16 and 18) above referred to, is driven from the shaft 170, through the bevel gears 253, shaft 255, gear 257, idler 259 and shutter pinion 261 (Fig. 14).

In the positive unit the objective 263 is slidably mounted in a sleeve 265 projecting forwardly from the casing of the unit, as indicated in Figs. 8, 13, 14, 16 and 18, and may be retained in any desired position with respect to this sleeve by means of a clamp 267, thereby affording a quick adjustment for approximate focusing, and increasing the focusing range over what could be obtained with the usual focusing device 269 only. In practice, the clamp 267 is used for rough adjustment of focus, and the device 269 for fine adjustment. In adjusting the focus (which is done when the apparatus is assembled and need not be done again unless the lens or the desired ratio of magnification is changed), the operator opens the slide 271 in the rear of the casing of the positive unit and looks through the window 273 and judges the focus by the clearness of the image on the ground-film inserted in the aperture-plate in the place ordinarily occupied by the film.

Whenever the operator wishes to judge the light value on the positive film, he needs only to open the slide 271 and look through the window 273. The positive film transmits a certain portion of the light incident upon it and thus serves as an indicator of the light value on the positive and the tube 275 serves to exclude light from any portion of the film other than the relatively small area thereof that is exposed at the aperture-plate. It is thus possible to proceed with the printing operation immediately after judging the light value on the positive and making any needed adjustment therefor, without further threading of the film; and it is likewise possible to examine the light value on the positive at any time with the film in the machine, without loss of more than an insignificant portion of the film material. Furthermore, the process of printing may be observed during operation of the apparatus if daylight is not allowed to pass into the tube from behind. This light value required on the positive film depends upon the speed of operation, the sensitiveness of the positive film emulsion, the size of the stop in the objective, the amount of angular opening of the shutter, the intensity of the light source, and the speed of the driving motor. These are factors, any one or all of which may be suitably varied to give the proper illumination on the positive film, whatever may be the density of the negative film.

The width of the pictures on the negative is preferably lengthwise of the film and substantially twice the height of standard pictures; the height of the pictures on the negative film is substantially equal to the width of standard pictures, as indicated above and in Figs. 18, 19 and 20; and since standard pictures are about three quarters of an inch high by one inch wide, having thus an area of three fourths square inch, while the pictures on the negative film are about 1 inch high and one and one-half inches wide, having thus an area about one and one-half square inches, the pictures on the negative film having substantially double the area of standard pictures. The emulsion side of the negative film is preferably away from the source of light. The positive film is preferably approximately of the standard size, with the top of the pictures toward the leading end of the film and the width of the pictures transverse of the film. By arranging the positive film so that its emulsion is on the side of the film toward the source of light, the developed positive may be projected with the emulsion toward the lamp. Furthermore, with this relation of parts, refraction of light through the film material in the printing operation does not affect the accuracy of the projected picture. A suitable width of negative picture is eight holes, or twice the usual height of pictures on a standard negative film; though by simply adjusting the crank 107 or replacing it with one of different size, the feed may be seven or nine holes, or some other distance. In such case it would ordinarily be desirable to adjust the ratio of reduction so as to fill the positive picture space as completely as possible.

The magazines 155, 157, are light-tight, and are attached to the light-tight positive inner casing in a light-tight way. Referring, for convenience, to the upper or take-up magazine 157, (Figs. 8, 12, 13, 16 and 18), the main or cylindrical part of the magazine is provided with a nose 277 through which the film enters or leaves the magazine, and it is this nose or extension that engages a dark box 278 on the unit casing to form a light-tight joint therewith. The details of this joint are shown on an enlarged scale in Figs. 30 to 36, wherein Figs. 30 and 31 show the parts in position for operation, Fig. 32 shows the door open, Figs. 33 and 34 show the door open and the magazine and casing separated, Fig. 35 shows the dark box part of the joint and Fig. 36 shows the magazine part of the joint.

The magazine nose 277 is provided on one of its four sides, in this instance on the underside, with a lip 279 registering with a groove 281 in the underside of the dark box 278. At either of the lateral sides of the magazine nose is a groove 283 and lip 285 engaging, respectively, a lip 287 and groove 289 in the sides of the dark box. At the top side of the magazine nose is a groove 291 and a lip 293 engaging, respectively, a lip 295 and flush part 297 of a cover 298 hinged on the dark box and adapted to be locked in closed position by a catch 299. In order to protect the film further from the light, strips of velvet 301, 303, are secured under the top and bottom edges, respectively, of a plate 305 adapted to be screwed onto the outer face of the magazine nose and provided with an aperture registering with the aperture in said nose. After said strips have been secured under said plate, the free ends of the strips are passed into the magazine nose through said aperture and between a pair of leaf-springs 307, 309 therein. The upper velvet is passed beneath a roller 311 and is pasted around the upper side of the magazine as far as the velvet will reach. The lower strip is similarly pasted around the lower side of the magazine. The leaf-springs tend to press the two velvet strips together and thus to exclude any light from the magazine when the magazine is disengaged from the dark box, and to exclude light from the film during its passage into or out of the magazine. The velvet serves a further purpose of facilitating the threading of the film through this narrow aperture in the magazine nose. The magazine can be readily removed from the dark box by simply opening the cover 298 and lifting the magazine upwardly out of the dark box. The light-tight magazine nose automatically protects the film therein from exposure to light, and no precaution need be taken against allowing the magazine to lie unprotected in daylight.

The lower or feed magazine is similar to the upper or take-up magazine, except that the two are applied to the positive-unit housing or casing in opposite directions; that is, the upper magazine is above its nose, while the lower magazine is below its nose. The relatively inverted positioning of the magazines is insured by having the bottom side of the lower dark-box shaped to correspond with the upper side (the lid) of the upper dark box, the lid of the lower box corresponding in contour to the bottom of the upper box, with the vertical ends of the two boxes all alike. This prevents the operator from inserting either magazine into the take-up dark box or into the feed box wrong side up. The magazines are preferably similar and interchangeable.

As indicated in Fig. 18, a guide support 313 is attached to the take-up magazine and engages a bracket 315 on the positive unit. This is for the purpose of holding the magazine rigid under the strain of the spring belt. A similar structure may be utilized for the feed magazine, in case the positive unit needs to be run backward during a material part of its operation, as referred to above in connection with the printing of "trick" pictures.

In view of the above, it will be seen that the several objects of the invention are achieved and other advantageous results attained.

As various possible embodiments might be made of the above invention and as various changes might be made in the embodiments above set forth, it is to be understood that all matter herein set forth or shown in the accompanying drawings is to be interpreted as illustrative and not in a limiting sense.

I claim:

1. A moving-picture copying apparatus combining a negative unit having a plate provided with an aperture of substantially double the standard size for exposing an image on a negative film of standard size, the image covering substantially double the area of standard images and having its height transverse of the film; a positive unit having a plate provided with an aperture of substantially standard size for exposing a picture area on a positive film of standard size positioned at right angles to the negative film; and an optical system adapted to reduce said image to a picture of substantially standard size and arrangement on the positive film.

2. A moving-picture copying apparatus combining a negative unit having intermittent-feed mechanism of double the standard stroke, a plate having an aperture of substantially double the standard size for exposing successive images on a negative film of standard size, the images covering substantially double the area of standard images and having their height transverse of the film; a positive unit having intermittent-feed mechanism of standard stroke, a plate having an aperture of substantially standard size for exposing successive picture areas on a positive film of standard size positioned at right angles to the negative film; a shutter for excluding light from the positive film during periods of movement of said film; an optical system adapted to reduce said images to pictures of substantially standard size and arrangement on the positive film; and means for operating the shutter and intermittent-feed mechanisms in synchronism.

3. The process of motion picture photography, which comprises reducing pictures of approximately double the standard area, taken on standard negative film, with the height of the pictures transverse of the film, by projecting said pictures upon a standard positive film with the pictures reduced to approximately standard size, with their height lengthwise of the film, such film being adapted for projection with standard projection apparatus.

4. A moving-picture copying apparatus combining a negative unit having means for exposing an image on a negative film of standard size, the image covering materially more than the area of standard images and having its height transverse of the film; a second unit having means for exposing a picture area on a sensitized film of standard size and standard picture spacing, positioned at right angles to the negative film; and an optical system adapted to focus said image on the sensitized film, the latter film being adapted for projection in standard projection apparatus.

5. A moving-picture copying apparatus combining a negative unit having means for exposing an image on a negative film of standard size, the image covering substantially twice the area of standard images and having its height transverse of the film; a second unit having means for exposing a picture area on a sensitized film of standard size and standard picture spacing, positioned at right angles to the negative film; and an optical system adapted to focus said image on the sensitized film, the latter film being adapted for projection in standard projection apparatus.

6. The process of motion picture photography, which comprises reducing pictures of approximately double the standard area, taken on standard negative film, with the height of the pictures transverse of the film, by projecting said pictures upon a standard sensitized film with standard picture spacing with the height of the pictures lengthwise of the film, such film being adapted for projection in standard projection apparatus.

7. The process of motion picture photography, which comprises reducing pictures of materially larger than the standard area, taken on standard negative film, with the height of the pictures transverse of the film, by projecting said pictures upon a standard sensitized film with standard picture spacing with the height of the pictures lengthwise of the film, such film being adapted for projection in standard projection apparatus.

8. The process of motion picture photography, which comprises reducing pictures of materially larger than standard area, taken on standard negative film, with the height of the pictures transverse of the film, by projecting said pictures to substantially standard size upon a standard sensitized film with standard picture spacing with the height of the pictures lengthwise of the film, such film being adapted for projection in standard projection apparatus.

9. The process of producing motion picture films, which comprises taking a series of pictures on a motion picture film, each picture occupying an area substantially greater than the standard picture area, taking such pictures in a camera in which the ratio of width of picture area to distance of scene from camera lens is greater than the ratio of such dimensions in a standard camera; providing a second film, sensitized, of standard dimensions; and printing by optical reduction the images from the first film onto the second film, the printing step being such that the images printed onto the second film are of standard picture spacing and adapted, when developed, to be projected in standard projection apparatus.

10. The process of producing motion picture films, which comprises providing a first film having a series of pictures thereon, each picture occupying an area having, for a given size of characters and for a given distance from lens to characters, a materially larger-than-standard width of scene; providing a second film, sensitized, of standard dimensions; and projecting the pictures of the first film upon the second film; reducing such pictures during such projection, such pictures on the second film having standard picture spacing with the height of the pictures lengthwise of the film, and being adapted, after development, for projection in standard projection apparatus; and projecting the pictures of said second film so that the characters are of substantially standard size.

11. Apparatus of the class described, combining a casing having a dark box and a magazine having a nose provided with one of its four sides complementary to one side only of the four sides of the box, whereby the nose may be slid into the box with said complementary sides juxtaposed, but can not be inserted in said box in any other position relative to the box.

12. Apparatus of the class described, combining a casing having a dark box, a magazine having a nose provided with one of its four sides complementary to one side only of the four sides of the box, whereby the nose may be slid into the box with said complementary sides juxtaposed, but can not be inserted in said box in any other position relative thereto, and a light-tight aperture in the nose having strips of light-absorbing material each secured at its outer end beneath a removable cap and extending inwardly through the aperture and being fastened to the inner walls of the aperture, and springs forcing said strips together.

13. Apparatus of the class described, combining a casing having a dark box, a magazine having a nose provided with one side complementary to one side only of the box, whereby the nose and box may be joined in one relative position only, and a second box on the casing having its side opposite said side of the first box complementary to said side of said nose, whereby a magazine registering in one position in the first box registers in inverted position only, in the second box.

14. Apparatus of the class described, combining a casing having a dark box provided on one of its four sides with a groove, and on the adjacent sides with a lip and having on the fourth side a hinged cover provided with a rib, and a magazine having a nose provided on one of its four sides with a lip and on the adjacent sides with a groove, and on the fourth side with a groove, whereby the magazine nose may be slid into the box with the first sides of nose and box juxtaposed and a light-tight aperture in the magazine box.

In testimony whereof I have signed my name to this specification this 17th day of February, 1921.

EDWIN W. CLARK.